Nov. 10, 1936. J. L. FINCH Re. 20,163

KEYING

Original Filed May 21, 1929

INVENTOR
JAMES L. FINCH

BY W. T. Tower
ATTORNEY

Reissued Nov. 10, 1936

Re. 20,163

UNITED STATES PATENT OFFICE 20,163

KEYING

James Leslie Finch, Rocky Point, N. Y., assignor to Radio Corporation of America, a corporation of Delaware Original No. 1,887,236, dated November 8, 1932, Serial No. 364,830, May 21, 1929. Application for reissue May 30, 1933, Serial No. 675,651

36 Claims. (Cl. 250—8)

Figures 1, 2, 3, 4, 5, 6, 7, 8, 9, 10, 11:
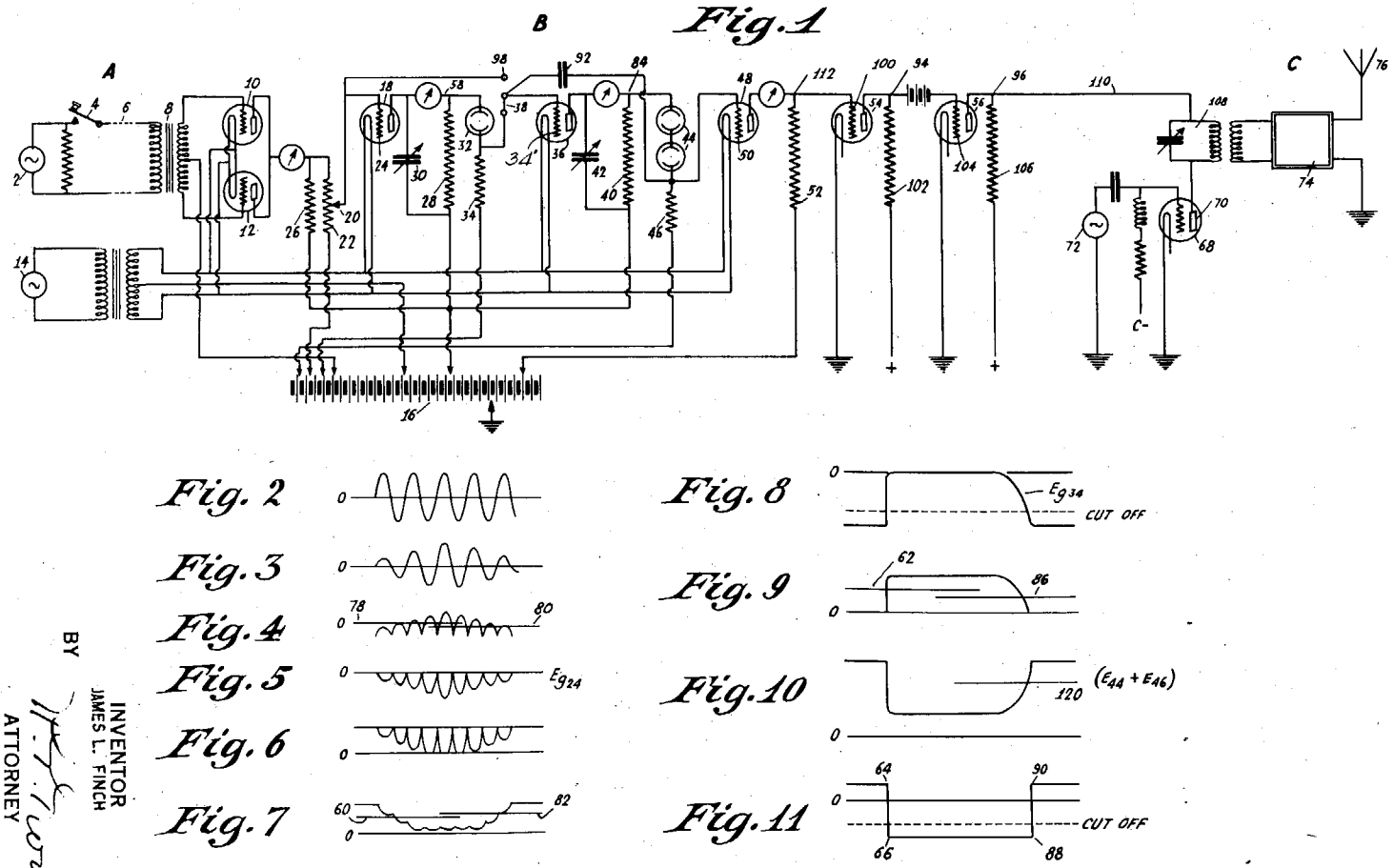

This invention relates to the art of signalling and has for one of its objects the provision of a new and useful method and means for keying.

Broadly, in the signalling art, the modulation of a working or signalling current according to signals or signal characters is designated as keying. When the modulation is accomplished by the use of mechanical relays, the procedure is called relay keying; whereas, if a tone is chopped or otherwise separated, rectified and then used to control the signalling or working current, the keying is known as tone keying.

Usually the last system referred to is employed, that is, tones or alternating currents are sent over a land line to some distant point at intervals corresponding to certain signal characters, they are then rectified and then the rectified tone is utilized to control the energization of say, a radiating transmitter. Because of defects in the generation of the tone itself or because of certain characteristics of the line over which the tone is transmitted to the transmitting station, the transmitter is often slowly turned on and off resulting in parasatics and other objectionable features, to a greater extent than has been the case wherein mechanical relaying is employed.

Accordingly, one object of this invention is to make keying substantially independent of the signal character envelope form of the controlling current or controlling tone. I do this by utilizing two values of the rectified tone envelope, one value to suddenly turn on a working or signaling current and the other value to suddenly turn off the current, and in this way I prevent intermediate values of the tone or beginning and ending values of the tone from affecting in any way the flow of the signaling current.

At this point it may be mentioned that although the tone keying method and device used in connection with this invention are especially appropriate to control the radiation from a transmitter radiating electromagnetic waves, they may also be applied to any land line system wherein, for example messages are to be relayed over long distances.

Furthermore, in the old type of tone keying devices as known in the art, at high speeds the tendency of the device would be to elongate signal characters, also an objectionable feature. Another object of my invention is to provide a tone keying device which will not elongate signals at high speeds of operation.

Ordinarily in tone keying systems presence of a tone corresponds to presence of a signalling current, for example, energization of a transmitter, for what is known as direct keying. For reverse keying presence of a tone corresponds to deenergization of the transmitter. Another object of this invention is to provide a tone keying system wherein the change from direct keying to reverse keying may be rapidly and easily accomplished.

In accordance with the practice of the United States Patent Office, the novel features of my invention are set forth in the appended claims. My tone keying system may best be understood however, both as to its structure and operation by referring to the accompanying drawing in which Figure 1 is a wiring diagram of my improved tone keyer, and Figures 2 to 11 inclusive, are curves used in connection with the explanation of the operation of the apparatus shown in Figure 1.

In Figure 1 tones are generated and chopped at A in accordance with signal characters and sent over a land line to apparatus at B where the chopped tones are utilized to cause sudden energization and deenergization of a radiating antenna at C. Usually presence of a tone in the land lines at A corresponds to radiation from C and non-presence of a tone in the line corresponds to deenergization of the antenna at C. However, means are provided at B for causing the reverse state of affairs, that is to say, presence of a tone at the land lines at A causes deenergization of the antenna at C etc.

More particularly I have shown at A a tone generator 2 which, by means of a keying device or chopping device 4, causes the presence of controlling currents or tones over a land line 6.

Tones on the land line are impressed through transformer 8 on the control electrodes of two electron discharge devices 10, 12 biased past cut off and arranged for full wave rectification.

The cathodes of the electron discharge device 10, 12 together with other similar devices at B are energized by a source of alternating current 14. Anode and grid biasing potentials are obtained from source 16.

Coupled to the output circuit of electron discharge devices 10, 12 is another electron discharge device 18 having its control electrode connected to point 20 of resistance 22 in potentiometer fashion such that, in the absence of output currents from tubes 10, 12, the bias on control electrode 24 of tube 18 allows a predetermined value of anode current to flow through electron discharge device 18. Anode potentials are supplied to devices 10, 12 through an impedance 26 in the form of a resistance from potential source 16.

As arranged, a predetermined value of rectified tone in the output circuit of tubes 10, 12 biases the control electrode 24 past cut-off so that an increase in tone has no further effect.

The anode potential of tube 18 is fed through an impedance 28 in the form of a resistance. Variations in potential across resistance 28 due to pulses of tone frequency currents are smoothed out by the use of a variable reactance 30 in the form of a variable condenser connected thereacross. In this manner the anode potential at tube 18 is approximately constant except for the variations caused by the tone signal envelope itself. It is to be here noted that the tops of signals are squared off by the limiting action of tube 18.

Associated with the output circut of tube 18 is a device 32, conductive solely upon the application thereto of a potential over a predetermined value. Conductive device 32 usually takes the form of a glow discharge device.

In series with device 32 is a resistance 34 which when device 32 is non-conducting, biases the control electrode 34' of electron discharge device 36 through switch 38 in its lower position, past cut-off so that a minimum current exists in the anode circuit of tube 36 when device 32 is non-conducting. Potential is fed to the anode of tube 36 through an impedance 40 in the form of a resistance from potential source 16. A variable reactance 42 is also shunted across resistance 40 in a similar manner to condenser 30 and resistance 28, for the purpose of smoothing out tone frequency pulsations occurring in the anode circuit of tube 36.

Associated with impedance 40 and the output circuit of tube 36 are devices 44 similar in nature to device 32, conductive solely upon the application of potentials of not less than a predetermined value.

In series with the devices 44 is an impedance 46 which when devices 44 are extinguished, that is to say, non-conductive, supplies to electron discharge device 48 a biasing potential for control electrode 50 such that a minimum current flows through the anode impedance 52, also in the form of a resistance.

Changes in potential occurring across impedance 52 are transferred through tubes 54, 56 to the anode circuit of a low power amplifier at C, such that for straight keying presence of a current in impedance 52 causes energization of the antenna at C, whereas, non-presence of a current in impedance 52 causes deenergization of the transmitting antenna at C.

Perfect generation and perfect transmission of a chopped tone would give a wave of the form shown in Figure 2. However, such generation and transmission is practically not feasible and hence, at a radio transmitting station, chopped waves of the type shown in Figure 3 are customarily received. If the wave shown in Figure 3 is rectified and used as ordinarily used for controlling the energization of a transmitting antenna, because of its sloping outlies slow energization and slow deenergization of the transmitter will result, causing as already indicated undesirable effects.

In the apparatus used in accordance with my invention these undesirable effects are eliminated. Thus, by suitably adjusting the circuits at B, I can make energization and deenergization of the antenna at C substantially independent of the rectified tone envelope of the type shown in Figure 4.

Thus, assume for example, the application of a tone wave of the form shown in Figure 3 to the primary of the transformer 8. After rectification it will appear in the output circuit of tubes 10, 12 as shown in Figure 4. The resulting potential on the grid 24 of tube 18 will be as shown in Figure 5. The resulting plate current is made to have the form of Figure 6 which is smoothed out by condenser 30 to give the curve shown in Figure 7. The flattening of curves 6 and 7 is due, of course, to the limiting action of tube 18.

Now I have started with a definite value of plate current flowing in tube 18 and I make this current of such a value that point 58 is kept slightly below the break down voltage of device 32. As the plate current through tube 18 decreases the potential at point 58 increases and by suitably choosing the constants of the various electrical elements involved I make matters such that for current value 60, see Figure 7, device 32 breaks down.

When 32 breaks down there is a sudden current flow in resistance 34 causing the grid of tube 36 to rise in potential from a potential less than cut-off to a potential giving a predetermined anode current flow through tube 36. The change in grid potential of tube 36 is given by curve 8 and the resulting anode current through resistance 40 is given by curve 9.

In the absence of control energy on line 6, the devices 44 are conductive. When current of the form shown in curve 9 flows through impedance 40 the potential applied to devices 44 is lessened suddenly such that when the current rises to value 62 in Figure 9 through resistance 40, devices 44 suddenly become, because of the sudden drop in potential applied thereto, extinguished. The last extinguishment causes the potential on the grid 50 of tube 48 to move suddenly from point 64 on curve 11 to point 66 below cut-off. There results, therefore, a sudden decrease in current through resistance 52 which by the action of tubes 54 and 56 causes a sudden increase in potential to the anode 70 of the low power amplifier stage 68, thereby allowing oscillations from alternator 72 to be amplified by the high power amplifier 74 and then radiated over the antenna 76.

All this action is made due, of course, by the choice of suitable values for the various electrical elements involved when a predetermined value of the rectified tone envelope, say value 78 of Figure 4, is reached.

The action at the antenna is due, of course, to the fact that when tube 56 is drawing current the plate potential of tube 68 is so reduced that no high frequency currents are fed to the high power amplifier 74. It is only when plate current at 56 is turned off that the potential on anode 70 is made sufficiently high that high frequency currents from 72 reach high power amplifier 74.

To briefly summarize the action just described the following is given. Presence of control energy or tone causes tube 18 to be biased to cut-off thereby causing sudden flow of current from one value to another, namely from zero to a finite value through 32. This current flow in turn causes current flow through tube 36 which causes devices 44 associated therewith to become extinguished suddenly, thereby cutting-off current flow suddenly through tube 48, the effect of the stoppage and flow through tube 48 becoming effective through devices 54, 56 and 68 to cause a working current or signalling current to flow in the antenna 76.

A detailed description of the action of impedance 52 and vacuum tubes 54 and 56 for controlling the output of vacuum tube 68 follows. It has been shown how the presence of tone causes a minimum of current to flow through resistance 52. This means, of course, that the grid 100 of tube 54 becomes positive and a large current flows through resistance 102. Current flowing through resistance 102 means that the grid 104 of tube 56 becomes biased to cut-off such that point 96 because of the minimum, of zero current flowing through resistance 106 becomes of sufficiently high potential value to cause amplification at tube 68.

For a reverse state of affairs, that is when resistance 52 carries current, a large current will flow through resistance 106 thereby cutting down plate potential of anode 70 of tube 58 thereby preventing the amplification or presence of high frequency currents from generator 72 in tunable circuit 108.

It is possible, of course, to omit tubes 54 and 56 and to connect point 96 of line 110 for supplying plate potential to tube 68 directly to point 112 on resistance 52. By the last mentioned connection it will be seen that when there is presence of a tone, no current flows through resistance 52 with the result that the desired amplifying plate potential is applied to anode 70 thereby allowing of a high frequency current supply to the high power amplifier 74 which in turn results in radiation from antenna 76.

By the foregoing statements it should be clear as to the manner in which the antenna is suddenly and completely energized when a predetermined value of control energy or tone is reached. The manner in which the antenna is completely and suddenly deenergized when the tone falls to a predetermined value say 80, see Figure 4, I shall next explain.

When the tone value falls to the value 80, the plate current through tube 18 will rise to some value 82 slightly above value 60 which caused energization of the antenna. From what has already been said it will be seen that this value of plate current 82 flowing in the plate circuit of tube 18 will cause such a potential to be impressed on grid 34′ that the current flowing in impedance 40 will correspond to 86, Figure 9. This in turn causes the potential impressed across devices 44 plus impedance 46 to be increased to the breakdown voltage 120 (Figure 10). At this point a definite value of current flows through devices 44 and resistance 46 which in turn causes a decreased bias on grid 50 thereby causing current to flow through the output circuit of tube 48. By the action of tubes 54, 56 the last mentioned current flow causes decreased potential on anode 70 of tube 68 to such a value that alternations from 72 are unable to reach amplifier 74 to be amplified and thereby radiated by antenna 76.

Point 82 of Figure 7 corresponding to point 86 of Figure 9, gives the value of current flowing through resistance 40 which will cause 84 to have a potential value sufficient to cause a breakdown of devices 44. The sudden discharge through devices 44 cause the squaring up (point 88 of Figure 10) of the grid potential applied to tube 48.

Accordingly, it will be seen that value 78, (see Figure 4) of the tone causes a sudden flow from zero to a finite value through discharge device 32 thereby causing a squaring up of the beginning of a signal, which is best illustrated in Figure 10 by the line between points 64 and 66 which gives the sudden change in potential occurring on the grid of tube 48 when device 32 becomes suddenly conductive. Because of the limiting action of tube 18 intermediate values of the tone between points 78 and 80, (see Figure 4) have no effect, and, as a result, tops of signals are squared up, corresponding to complete and constant energization of the antenna, between time intervals corresponding to points 66 and 88, see Figure 10.

A certain value of the tone signal for example, point 80 of Figure 4, causes sudden flow from zero to a finite value through discharge devices 44 thereby causing sudden complete deenergization of the antenna, which corresponds to the line 88, 90 of Figure 11. It will, therefore, be seen that if a character is too weak, that is to say, it does not reach the value 78 in Figure 4, it will not affect the transmitter; whereas if it hits the value 78, the transmitter goes completely over to marking, higher values not having any effect on the antenna energization. For values lower than 80, see Figure 4, the transmitter will go completely over to spacing or will become completely deenergized. The choice of two values of tone or controlling current for beginning and ending signal characters, makes them independent of starting and ending values of tone and thereby prevents signal elongation.

There may be a case wherein, after devices 44 break down but before device 32 became extinguished, the tone starts increasing again. This would present the possibility of starting a new character gradually and to obviate this I insert between the devices 44 and 32 a condenser 92 of such a value that when devices 44 break down there is a sudden surge of current through condenser or reactance 92 which reduces the voltage across device 32 momentarily, extinguishing it. In this manner gradual starting of characters is obviated.

For reverse signalling, that is to say, for energization of the antenna with the absence of a tone on line 6, tube 56 may be omitted and point 96 connected directly to point 94. However, I have provided another and more readily accomplishable means for causing reverse signalling and this is by the provision of switch 38 connected between output circuit of tube 18 and the input circuit of tube 36. By throwing switch 38 to the upper terminal 98 reverse signalling will be had, although at the expense of the advantages presented by having the tube 18 and its associated glow discharge device 32 in circuit.

Elongation of signals, it is to be further noted, is also caused by excessive amplitude of controlling tone signals when smoothing is introduced after rectification but before limiting. It is to be remembered that in my device I have provided tube 18 as a limiter before introducing smoothing capacitor 30.

It will be apparent that many minor changes may be made without departing from the scope of this invention and accordingly I am not to be limited by what has been described specifically but solely by the breadth of the appended claims.

Having thus described my invention, what I claim is:

1. In a signalling system, the combination of an electron discharge device having a glow discharge device in its anode circuit conductive solely upon the application of a predetermined value of potential thereto; a resistance in series with said glow device; a source of direct current potential for supplying anode potential to said electron device; means for supplying unidirectional electromotive force to the input terminals of said electron device in accordance with a signal to be transmitted, predetermined values of said signal electromotive force adapted to cause sudden breakdown of said glow device whereby it becomes current conductive; and means connected in parallel with said resistance for utilizing the current of flow through said glow device for controlling the energization of a transmitter.

2. A tone source; means for rectifying said tone; an electron discharge device; means for applying the rectified tone to the input terminals of said device for controlling the anode current flow thereof; an element conductive solely upon the application of a predetermined value of potential thereto, in the output circuit of said device; an impedance associated with said element, and means associated with said impedance for varying the energization of a transmitter whenever said element becomes conductive.

3. A tone source; means for rectifying said tone, an electron discharge device, means for applying the rectified tone to the input terminals of said device for controlling the anode current flow thereof; an element conductive solely upon the application of a predetermined value of potential thereto in the output circuit of said device; a resistance connected to said element the voltage drop across which varies with current flow through said element; and means associated with said resistance responsive to changes in potential thereacross for changing the energization of a transmitter whenever said element becomes conductive.

4. A system for modifying the form of electric signals, comprising a three-electrode space discharge device having an input circuit on which said signals are impressed, and an output circuit, a source of space current and a resistance element in series in said output circuit, a circuit connected across said space current source and series resistance element, and comprising a gaseous space discharge device and an impedance element in series, and means for taking off the voltages across said impedance element.

5. In combination, an electron discharge device; a source of anode potential therefor; means for varying the anode potential in accordance with input energy supplied to said discharge device; a device conductive solely upon the application of a potential of predetermined value thereto coupled to the anode circuit of said electron device; another electron discharge device coupled to said conductive device; another device, conductive solely upon the application of predetermined values of potential applied thereto coupled to the anode circuit of said last mentioned electron discharge device and means responsive to the changes in current through said last mentioned conductive device for affecting a working current in response to the input energy applied to said first mentioned electron discharge device.

6. In combination, an electron discharge device; means for applying controlling energy thereto to vary the potential on the anode of said device; a device conductive solely upon the application of a potential of predetermined value thereto coupled to the anode circuit of said electron device becoming thereby, responsive to the controlling energy; another electron discharge device coupled to said conductive device; another device, conductive solely upon the application of predetermined values of potential applied thereto coupled to the anode circuit of said last mentioned electron discharge device thereby becoming responsive to the controlling energy applied to said first mentioned electron discharge device; and means responsive to the changes in current through said last mentioned conductive device for affecting a working current.

7. In combination, an electron discharge device; a source of anode potential therefor; means for varying the anode potential in accordance with input energy supplied to said discharge device; a device conductive solely upon the application of a potential of predetermined value thereto coupled to the anode circuit of said electron device; another electron discharge device coupled to said conductive device; another device, conductive solely upon the application of predetermined values of potential applied thereto coupled to the anode circuit of said last mentioned electron discharge device; means responsive to the changes in current through said last mentioned conductive device for affecting a working current; and means between said conductive devices for preventing simultaneous conduction by both over an appreciable length of time.

8. The method of controlling the flow of a working current according to the envelope of a rectified controlling wave, which includes, producing a current flow suddenly from zero to a finite value when said rectified wave reaches a predetermined value; utilizing the sudden flow of current to vary the flow of the working current; producing another current flow from zero to a finite value suddenly when the envelope falls below a predetermined value and utilzing the last mentioned flow to vary in a reverse manner the working current.

9. In combination, in a system for controlling the flow of a working current according to the envelope of a rectified controlling wave, means for producing a current flow suddenly from zero to a finite value when said rectified wave reaches a predetermined value; means for utilizing the sudden flow of current to vary the flow of the working current; means for producing suddenly another current flow from zero to a finite value when the envelope falls below a predetermined value and means for utilizing the last mentioned flow to vary, in a reverse manner, the working current.

10. The method of controlling the flow of a working current according to the envelope of a controlling wave, which includes, producing a current flow suddenly from one value to another when said rectified wave reaches a predetermined value; utilizing the sudden flow of current to vary the flow of the working current; producing another current flow from one value to another value suddenly when the envelope falls below a predetermined value, and utilizing the last mentioned flow to vary, in a different manner, the working current.

11. The method of signalling, which includes, generating a current modulating the current in accordance with a signal to be transmitted; rectifying the modulated current; causing a current flow from zero to a finite value when the rectified current reaches a certain value; utilizing the current flow for suddenly energizing a transmitter; causing suddenly another current flow when the rectified current falls below a predetermined value and utilizing said last mentioned flow to suddenly deenergize a transmitter.

12. In apparatus for controlling the flow of a working current according to the envelope of a controlling wave, means for producing a current flow suddenly from one value to another when said rectified wave reaches a predetermined value; means for utilizing the sudden flow of current to vary the flow of the working current; means for producing another current flow from one value to another value suddenly when the envelope falls below a predetermined value; and means for utilizing the last mentioned flow to vary, in a different manner, the working current.

13. In a signalling system, means for generating a tone, means for modulating the tone in accordance with a signal to be transmitted; means for rectifying the modulated tone; means for causing a current flow from zero to a finite value when the rectified tone reaches a certain value; means for utilizing the current flow for suddenly energizing a transmitter; means for causing suddenly another current flow when the rectified tone falls below a predetermined value and means for utilizing said last mentioned flow to suddenly deenergize a transmitter.

14. The method of signaling, which includes, generating a tone, modulating the tone in accordance with a signal to be transmitted; rectifying the modulated tone; causing a current flow from zero to a finite value when the rectified tone reaches a certain value; utilizing the current flow for suddenly energizing a transmitter; causing suddenly another current flow when the rectified tone falls below a predetermined value and utilizing said last mentioned flow to suddenly deenergize a transmitter.

15. A tone source; means for rectifying said tone; an electron discharge device; means for applying the rectified tone to the input terminals of said device for controlling the anode current flow thereof; an element conductive solely upon the application of a predetermined value of potential thereto, in the output circuit of said device; an impedance connected to said element; a variable reactance across said impedance and means associated with said impedance for changing the energization of a transmitter whenever said element becomes conductive.

16. In combination, an electron discharge device; a source of anode potential therefor; an impedance between said source and the anode of said device; an impedance associated with a device, conductive only upon the application of voltages over a predetermined value thereto, coupled to the anode circuit of said electron device; means for causing a steady current flow in said first mentioned impedance so that the potential across the conductive device is not sufficient to cause its breakdown; means for reducing the anode current according to the beginning of a signal character thereby affecting the current flow in the impedance associated with said conductive device; another electron discharge device coupled to said last mentioned impedance; a device conductive only upon the application of voltages over a predetermined value thereto coupled to the anode circuit of said last mentioned electron discharge device so that when said electron discharge device is relatively non-conductive and conductive the current through said last mentioned conductive discharge device changes; an impedance associated with said last mentioned conductive device and means for utilizing the changes in potential across said impedance in response to control energy applied to said first mentioned electron discharge device to affect the energization of a transmitter.

17. In combination, an electron discharge device; a source of anode potential therefor; an impedance between said source and the anode of said device; an impedance associated with a glow discharge device coupled to the anode circuit of said electron device; means for causing a steady current flow in said first mentioned impedance so that the potential across the glow discharge device is not sufficient to cause its breakdown; means for reducing the anode current according to the beginnings and ends of signal characters thereby affecting the current flow in the impedance associated with said glow device; another electron discharge device coupled to the impedance associated with said glow device; a glow discharge device coupled to the anode circuit of said last mentioned electron discharge device so that when said electron discharge device is relatively non-conductive and conductive the current through said last mentioned glow discharge device changes; an impedance associated with said last mentioned glow discharge device and means for utilizing the changes in potential across said impedance arising when the current through said last mentioned electron discharge device changes to affect the energization of a transmitter.

18. In combination, an electron discharge device; a source of anode potential therefor; a resistance between said source and the anode of said device; a resistance and a glow discharge device in series coupled to the anode circuit of said device; means for causing a steady current flow in said first mentioned resistance so that the potential across the glow discharge device is not sufficient to cause its breakdown; means for reducing the anode current according to the beginning of a signal character whereby said glow discharge device breaks down causing current flow in the resistance in series therewith; another electron discharge device coupled to said resistance and glow discharge device; a glow discharge device connected to the anode circuit of said last mentioned electron discharge device so that when said electron discharge device is relatively non-conductive and conductive said last mentioned glow discharge device is non-conductive and conductive respectively; a resistance connected with said last mentioned glow discharge device and means for utilizing the changes in potential across said resistance arising when said last mentioned electron discharge device becomes conductive and non-conductive to affect the energization of a transmitter.

19. In combination, an electron discharge device; a source of anode potential therefor; an impedance between said source and the anode of said device; an impedance and a glow discharge device in series coupled to the anode circuit of said device; means for causing a steady current flow in said first mentioned impedance so that the potential across the glow discharge device is not sufficient to cause its breakdown; means for reducing the anode current according to the beginning of a signal character whereby said glow discharge device breaks down causing current flow in the impedance in series therewith; another electron discharge device coupled to said last mentioned impedance; a glow discharge device connected to the anode circuit of said last mentioned electron discharge device so that when said electron discharge device is relatively non-conductive and conductive said last mentioned glow discharge device is conductive and non-conductive respectively; a reactance between said glow discharge devices to prevent both from being relatively conductive at the same time; an impedance connected with said last mentioned glow discharge device and means for utilizing the changes in potential across said impedance arising when said last mentioned electron discharge device becomes conductive and non-conductive to affect the energization of a transmitter.

20. In combination, an electron discharge device; a source of anode potential therefor; a resistance between said source and the anode of said device; a resistance and a glow discharge device in series coupled to the anode circuit of said device; means for causing a steady current flow in said first mentioned resistance so that the potential across the glow discharge device is not sufficient to cause its breakdown; means for reducing the anode current according to the beginning of a signal character whereby said glow discharge device breaks down causing current flow in the resistance in series therewith; another electron discharge device coupled to said last mentioned resistance; a glow discharge device connected to the anode circuit of said last mentioned electron discharge device so that when said electron discharge device is relatively non-conductive and conductive said last mentioned glow discharge device is conductive and non-conductive respectively; a condenser between said glow discharge devices to prevent both from becoming relatively conductive at the same time; a resistance associated with said last mentioned glow discharge device and means for utilizing the change in potential across said resistance arising when said last mentioned electron discharge device becomes conductive and non-conductive to control the flow of a working current.

21. An electron discharge device; a glow discharge device and an impedance in series connected to the anode of said electron discharge device; means for causing flash-over in said glow discharge device and current flow through said impedance when a predetermined value of potential is applied to the input terminals of said electron discharge device; another electron discharge device coupled to said series connection having an impedance and a glow discharge device in series coupled to its anode circuit; whereby potentials applied to the input terminals of said last mentioned electron discharge device cause extinguishment and flash-over of said last mentioned glow discharge device; and means for utilizing the voltage changes arising across said last mentioned impedance when said last mentioned glow discharge device becomes conductive and non-conductive for varying the flow of a working current.

22. An electron discharge device; a glow discharge device and a resistance in series connected to the anode of said electron discharge device; means for causing flash-over in said glow discharge device and current flow through said resistance when a predetermined value of potential is applied to the input terminals of said electron discharge device; another electron discharge device coupled to said series connection, having a resistance and a glow discharge device in series coupled to its anode circuit; whereby potentials applied to the input terminals of said last mentioned electron discharge device cause extinguishment and flash-over of said last mentioned glow discharge device; and means for utilizing the voltage change arising across said last mentioned resistance when said last mentioned glow discharge device becomes extinguished and flashes over for varying the flow of a working current.

23. An electron discharge device; a glow discharge device and a resistance in series connected to the anode of said electron discharge device; means for causing flash-over in said glow discharge device and current flow through said resistance when a predetermined value of potential is applied to the input terminals of said electron discharge device; another electron discharge device coupled to said series connection having a resistance and a glow discharge device in series coupled to its anode circuit; a reactance connected between said resistances; and means for utilizing the voltage change arising across said last mentioned resistance when said last mentioned glow discharge device becomes extinguished or flashes over for varying the energization of the transmitter.

24. An input circuit; an electron discharge device; means for coupling the circuit and device; a glow discharge device and a resistance in series connected to the anode of said electron discharge device; means for causing flash-over in said glow discharge device and current flow through said resistance when a predetermined value of potential is applied to the input terminals of said electron discharge device; another electron discharge device, coupled to said series connection, having a resistance and a glow discharge device in series coupled to its anode; a condenser connected between said resistances; switching means for coupling said input circuit at will directly to said second mentioned electron discharge device and means for utilizing the voltages arising in said last mentioned resistance, due to variations in energy in said input circuit, when said last mentioned glow discharge device becomes extinguished or flashes over for varying the flow of a working current.

25. Keying means comprising, a source of tone frequency, a thermionic discharge tube having input and output circuits, rectifying means interposed between said tone frequency source and the input electrodes of said thermionic discharge tube, a source of potential in series with a resistance connected between the output electrodes of said tube, a glow discharge tube and a resistance connected in series in parallel with said last named circuit, and means connected in parallel with said last named resistance for utilizing the potentials appearing therein.

26. An arrangement as claimed in claim 24 in which said utilizing circuit comprises a thermionic discharge device having its control electrode connected to a point between said glow discharge device and said resistance.

27. Electrical apparatus comprising means for transmitting electrical energy only when said energy reaches a predetermined magnitude, a second means for transmitting electrical energy only when said energy reaches a predetermined magnitude and means for so electrically connecting said first means and said second means that, when the electrical output of one of said means is a maximum, the electrical output of the other of said means is a minimum.

28. Electrical apparatus comprising an amplifier having a control electrode, means for making said amplifier responsive only to voltages above a predetermined value, a second amplifier having a control electrode, means for so coupling said amplifiers that, when the control electrode of said first amplifier becomes more positive, the control electrode of said second amplifier becomes less positive and means for making said second amplifier responsive only to voltages above a predetermined value.

29. Electrical apparatus comprising a thermionic amplifier having a control electrode, means for so negatively biasing said electrode that said amplifier is inoperative until the voltage impressed on the input of said amplifier reaches a predetermined value, a second thermionic amplifier having a control electrode, means for so negatively biasing the control electrode of said second amplifier that said second amplifier is inoperative until the voltage impressed on the input of said second amplifier reaches a predetermined value and means for so electrically coupling said amplifiers that, when the output of one amplifier is a maximum, the output of the other amplifier is a minimum.

30. Electrical apparatus comprising a thermionic amplifier having a control electrode, means for so biasing said electrode that said amplifier is inoperative until the voltage impressed on the input of said amplifier reaches a predetermined value, a second thermionic amplifier having a control electrode, means for so biasing the control electrode of said second amplifier that said second amplifier is inoperative until the voltage impressed on the input of said second amplifier reaches a predetermined value and means, including a resistance unit common to both the output of said first amplifier and the input of said second amplifier, for so electrically coupling said amplifier that, when the output of one amplifier is a maximum, the output of the other amplifier is a minimum.

31. Electrical apparatus comprising a thermionic amplifier having a control electrode, means for so biasing said electrode that said amplifier is inoperative until the voltage impressed on the input of said amplifier reaches a predetermined value, a second thermionic amplifier having a control electrode, means for so biasing the control electrode of said second amplifier that said second amplifier is inoperative until the voltage impressed on the input of said second amplifier reaches a predetermined value and means, including a resistance unit common to both the output of said first amplifier and the input of said second amplifier, for so electrically coupling said amplifiers that direct current is amplified by said electrical apparatus.

32. Electrical transmitting apparatus comprising means for transmitting pulses of alternating current over a transmission line, means for rectifying said current after it has been transmitted over said line, transmitting means connected to said rectifier for transmitting electrical energy only when said current reaches a predetermined value, a second transmitting means for transmitting electrical energy only when said energy reaches a predetermined value, means for so electrically connecting said first transmitting mans to said second transmitting means that, when the electrical output of one of said transmitting means is a maximum, the output of the other of said transmitting means is a minimum, a radio transmitter, means responsive to pulses of current for modulating the output of said radio transmitter and means for electrically connecting said second-named transmitting means and said last-named means.

33. A signalling system comprising means for transmitting a carrier current in the form of abruptly interrupted pulses of current, means for receiving and rectifying said pulses of current, transmitting apparatus including a modulator responsive to said rectified pulses of current, and means free of mechanical inertia for transmitting said rectified pulses to said modulator and for substantially eliminating transients from said pulses.

34. The method of keying a radio transmitter which comprises transmitting a signal implse in the form of an alternating current, rectifying said signal impulse, so modifying said signal impulse that its amplitude is between two limiting values, and impressing said modified impulse on the input of said transmitter.

35. The method of changing the bias of a modulator tube by a predetermined constant amount for a short interval which comprises transmitting a signal impulse in the form of an alternating current, rectifying said signal impulse, so modifying said signal impulse that its amplitude is between two limiting values, and impressing said modified impulse on the input of said modulator tube.

36. Signalling apparatus for a transmitter comprising means for generating a pulse of direct current, said pulse having values above one limit and below another limit, means for so modifying said pulse that its amplitude is between said two limits, and means for impressing said modified pulse on the input of said transmitter.

JAMES LESLIE FINCH.